(12) United States Patent
Van Berlo et al.

(10) Patent No.: US 8,651,462 B2
(45) Date of Patent: Feb. 18, 2014

(54) METHOD AND LIFT CONSTRUCTION FOR LIFTING AND LOWERING A BLADE OF A WINDMILL

(75) Inventors: Martinus Marianus Maria Van Berlo, Waardenburg (NL); Adrianus Gerardus Maria Versteeg, Cothen (NL)

(73) Assignee: Dutch Heavy Lift Concepts B.V., Geldermalsen (NL)

( * ) Notice: Subject to any disclaimer, the term of this patent is extended or adjusted under 35 U.S.C. 154(b) by 548 days.

(21) Appl. No.: 12/988,272

(22) PCT Filed: Mar. 23, 2009

(86) PCT No.: PCT/NL2009/050135
§ 371 (c)(1),
(2), (4) Date: Nov. 11, 2010

(87) PCT Pub. No.: WO2009/128708
PCT Pub. Date: Oct. 22, 2009

(65) Prior Publication Data
US 2011/0042632 A1 Feb. 24, 2011

(30) Foreign Application Priority Data

Apr. 16, 2008 (NL) .................................... 1035301

(51) Int. Cl.
*B66D 1/26* (2006.01)
*B23P 15/04* (2006.01)
*B23Q 7/00* (2006.01)

(52) U.S. Cl.
USPC .......... 254/278; 29/889.1; 29/889.21; 29/559

(58) Field of Classification Search
CPC ........... F03D 11/00; F03D 11/04; F03D 9/00; F03D 1/06; B23P 15/04
USPC ............ 29/889.1, 889.21; 416/244 R, 204 R, 416/146 R; 290/44, 55; 254/285, 284, 283, 254/278
See application file for complete search history.

(56) References Cited

U.S. PATENT DOCUMENTS

2006/0151767 A1* 7/2006 Wobben ......................... 254/334
2006/0228220 A1* 10/2006 Wobben ..................... 416/244 R (Continued)

FOREIGN PATENT DOCUMENTS

DE 202004016460 * 10/2004 ............. F03D 11/04
DE 102004056340 * 5/2006 ............. F03D 11/04

(Continued)

OTHER PUBLICATIONS

JP 2006152862 Machine Translation, Jan. 11, 2011.*

(Continued)

*Primary Examiner* — Emmanuel M Marcelo
*Assistant Examiner* — Justin Stefanon
(74) *Attorney, Agent, or Firm* — SoCal IP Law Group LLP; Mark A. Goldstein

(57) ABSTRACT

A lift construction for lifting and lowering a blade of a windmill is described herein. The lift construction for lifting and lowering a blade of a windmill to and from its mounted position at a rotatable cone of the windmill comprises a first yoke mountable at the inside of the blade and a second yoke mountable in the cone of the windmill, wherein the first yoke and the second yoke are arranged to cooperate.

15 Claims, 6 Drawing Sheets

(56) References Cited

U.S. PATENT DOCUMENTS

| | | | |
|---|---|---|---|
| 2010/0005656 A1 * | 1/2010 | Vangsy | 29/889.1 |
| 2010/0225120 A1 * | 9/2010 | Krogh et al. | 290/55 |
| 2010/0254813 A1 * | 10/2010 | Dawson et al. | 416/146 R |
| 2012/0228881 A1 * | 9/2012 | Siegfriedsen | 290/55 |

FOREIGN PATENT DOCUMENTS

| | | | | |
|---|---|---|---|---|
| FR | 2649087 | | 1/1991 | |
| JP | 3-51182 U | * | 5/1991 | F03D 1/06 |
| JP | 2004293455 | * | 10/2004 | F03D 11/04 |
| JP | 2006152862 A | * | 6/2006 | F03D 11/00 |
| JP | 20061522862 | | 6/2006 | |
| JP | 2012062851 | * | 3/2012 | F03D 1/06 |
| WO | WO 9610130 | * | 4/1996 | F03D 11/00 |
| WO | WO 03102409 | | 12/2003 | |
| WO | WO 2004067954 | | 8/2004 | |
| WO | WO 2008000262 | * | 1/2008 | B66C 1/66 |
| WO | WO 2008155976 | * | 12/2008 | F03D 11/00 |
| WO | WO 2011110254 | * | 9/2011 | F03D 1/00 |
| WO | WO 2012034565 | * | 3/2012 | F03D 1/00 |

OTHER PUBLICATIONS

DE 202004016460 Machine Translation, Jan. 11, 2011.*

European Patent Office, International Search Report and Written Opinion for International Patent Application No. PCT/NL2009/050135, mail date Mar. 30, 2010, pp. 1-12.

* cited by examiner

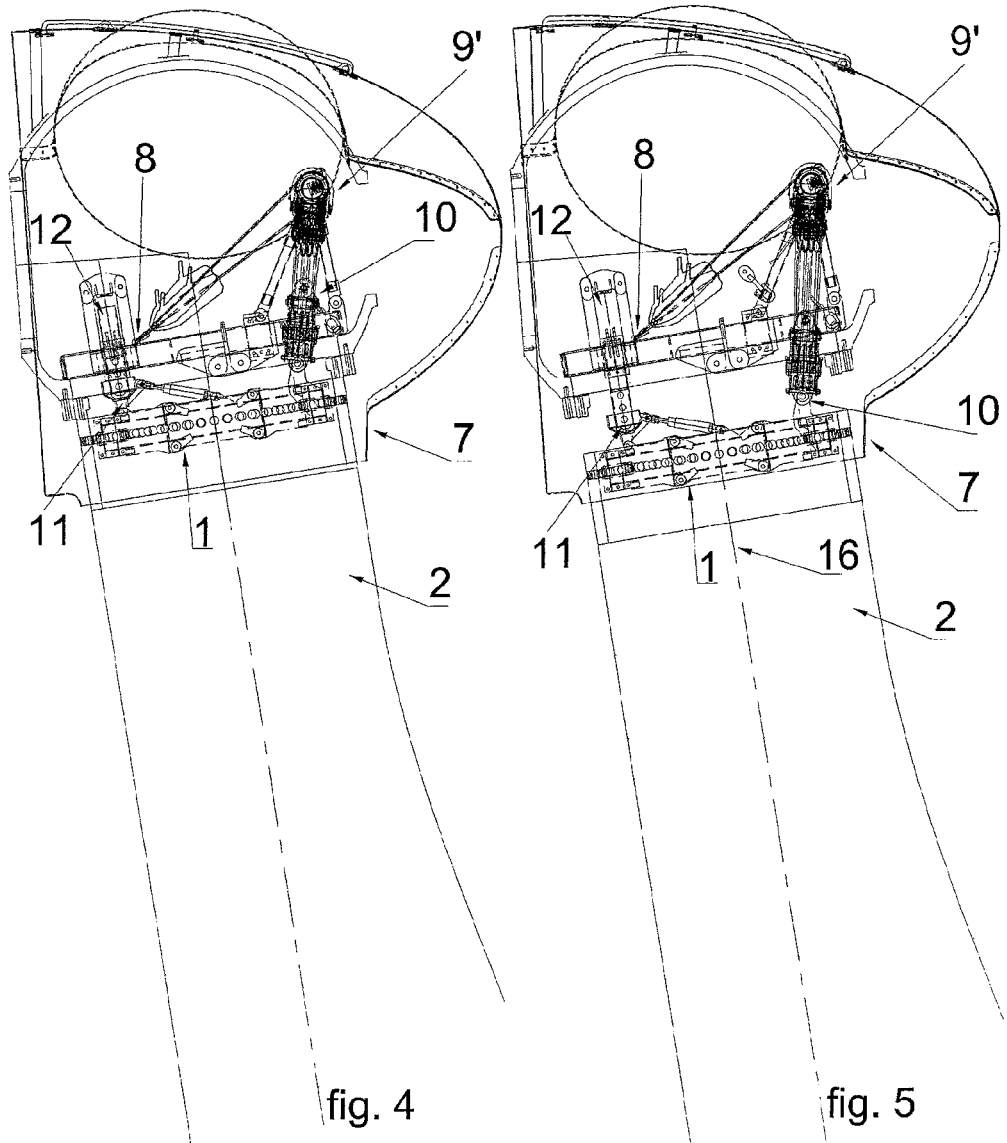

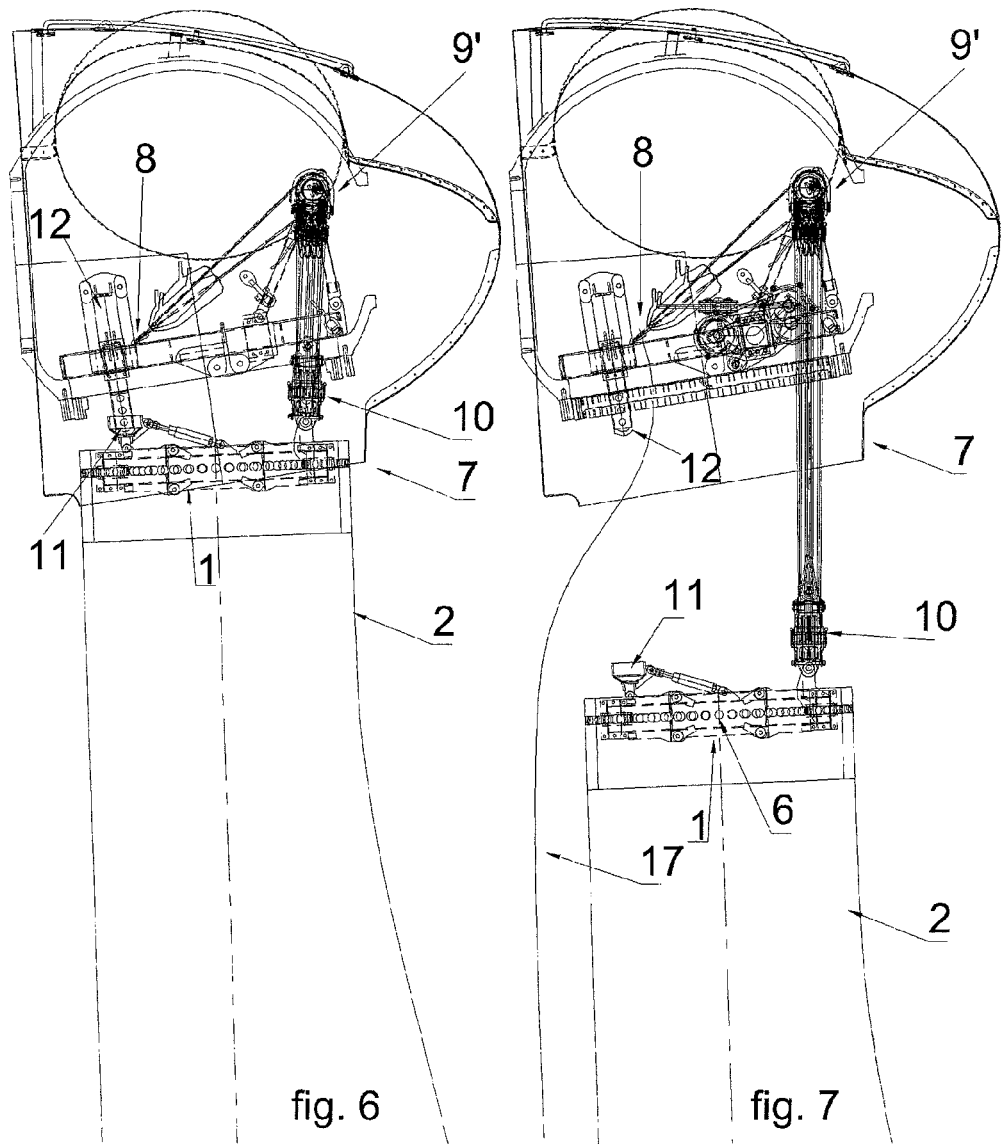

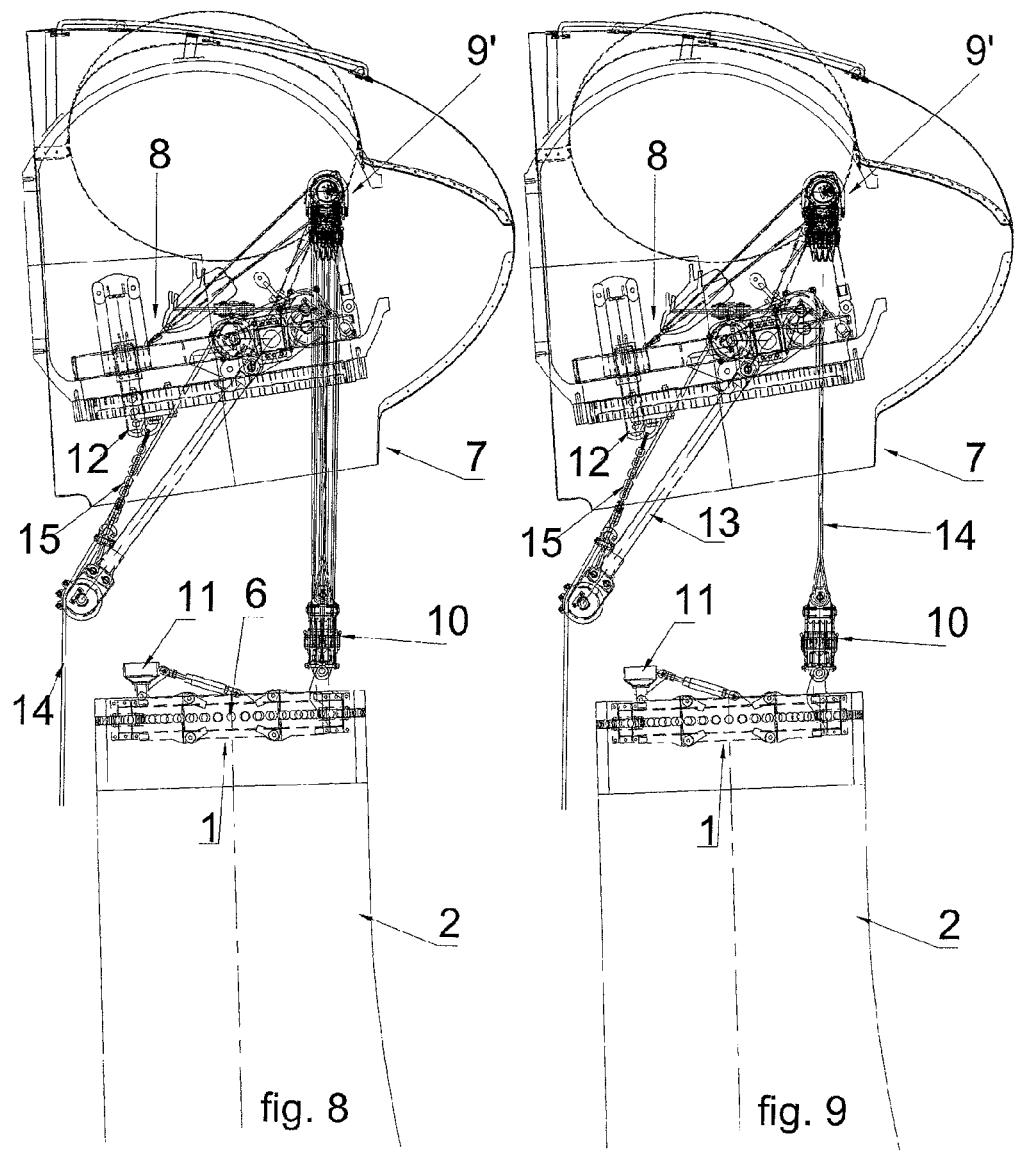

METHOD AND LIFT CONSTRUCTION FOR LIFTING AND LOWERING A BLADE OF A WINDMILL

RELATED APPLICATION INFORMATION

This patent claims priority from International PCT Patent Application No. PCT/NL2009/050135, filed on Mar. 23, 2009 entitled, "METHOD AND LIFT CONSTRUCTION FOR LIFTING AND LOWERING A BLADE OF A WINDMILL", which claims priority to Netherlands Patent Application No. 1035301, filed on Apr. 16, 2008 entitled "LIFTING AND LOWERING METHOD FOR E.G. WIND TURBINE BLADE, COMPRISES MODULAR HOIST MOUNTED ON ROTOR CASING WITH AID OF SUPPORT AND PULLEY BLOCKS", both of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a method and lift construction for lifting and lowering a blade of a windmill to and from its mounted position at a rotatable cone of the windmill.

The blades of windmills are long and heavy. A typical windmill blade is approximately 43 meters long and weighs between 4,000 kg and 50,000 kg. Due to its operation, a windmill's blade suffers resonances due to the repeated compression of air near to the windmill's standard. Such repeating stresses may eventually result in fatigue cracks, which are detrimental to the structural reliability of the windmill. As a consequence, inspections are carried out so as to establish whether or not a windmill blade must be replaced or repaired.

Any replacement of windmill blades is a costly affair, which is partly due to the heavy load of the windmill blades and the altitude at which the blades are mounted to the windmill's cone. Specifically the fact that windmill's are normally applied at places where no structural roads are available causes that specific measures are required, such as the application of temporarily road constructions, to make it possible that heavy duty cranes that may carry loads at high altitudes can be placed near to the windmill of which the blades have to be replaced.

It is an object of the invention to make the replacement of windmill blades more easy without necessity to employ heavy cranes, and to reduce the costs that are associated with any such replacement or in general with the dismounting or the mounting of the blades of a windmill.

In order to be able to meet the objectives of the invention a method and lift construction for lifting and lowering a blade of a windmill is proposed in accordance with one or more of the appended claims.

In a first aspect of the invention a lift construction is proposed comprising:
a first yoke mountable at the inside of the blade
a second yoke mountable in the cone of the windmill,
wherein the first yoke and the second yoke are arranged to cooperate.

With the lift construction of the invention it is possible that
a first yoke is mounted to the blade's inside
a second yoke is mounted in the windmill's cone, wherein the first yoke and the second yoke are provided with positioning means and hoisting means, and in that
when the blade is near to the windmill's cone, the positioning means and hoisting means of the yokes carry out a concerted operation so as to move the windmill's blade towards or away from the cone in a line that substantially coincides with the blade's orientation when in the mounted position, and that
when the blade is beyond a predefined distance with respect to the windmill's cone, the blade is lifted or lowered substantially vertically.

Accordingly, with the invention it is no longer required to employ heavy duty cranes which are capable to operate at high altitudes. Instead, the mounting or dismounting of a windmill's blade can simply be carried out by employing said first yoke mounted at the inside of the windmill's blade and said second yoke mounted in the cone of the windmill. As already indicated, for effectively carrying out the mounting or dismounting of a windmill's blade, it is preferable that the first yoke and the second yoke having cooperating hoisting means that are provided at the ends of the yokes which, in use, are distant from the windmill's standard. Likewise, it is preferable that the first yoke and second yoke have cooperating positioning or pushing means near to the ends of the yokes which, in use, are closest to the windmill's standard for at least maintaining a predefined alignment and/or distance of the ends of the yokes. An effective way of carrying out the positioning means that are provided on the first yoke and the second yoke is that the first yoke has a receptacle and the second yoke has an actuator or vice versa, wherein the actuator has an end that fits in said receptacle, such that upon activation of the actuator a predefined pressure is applied to the receptacle so as to balance the blade of the windmill in a predefined alignment. Accordingly, it is possible that with said predefined alignment the blade of the windmill occupies a position with respect to the cone of the windmill that allows it to be mounted or dismounted from the cone.

The ease of working with the lift construction according to the invention is promoted by arranging that the first yoke comprises at both its ends pins, which in use point at the blade's inside for mounting the first yoke to the blade. This is particularly true in case that the pins are placed at a position so as to be able to cooperate with pin-holes in the blade that are intended for connecting the blade to the windmill's cone.

Beneficially, the second yoke is provided with hoisting means that are connectable to the first yoke or a part thereof, in particular to a hoisting means or pad eye of the first yoke. The ease of operation of the lift construction in accordance with the invention is particularly supported by arranging that the hoisting means of the second yoke are (manually) adjustable. In a certain embodiment it is beneficial that the lift construction of the invention comprises a guiding arm for a lifting cable, which arm is connectable to the second yoke. With this lifting cable it is possible to simply lower or lift the windmill's blade vertically, for which purpose it is desirable that the lifting cable is connectable to the first yoke or a part thereof, in particular to a hoisting means or pad eye provided on the first yoke.

In order to secure that the guiding arm operates securely and safely it is desirable that the guiding arm is supported, for instance by connecting chains that connect the arm to the windmill's cone or a part thereof.

The invention is further embodied in the separate yokes as described hereinbefore as part of the lift construction of the invention. Such a yoke that is particularly used for mounting at the inside of the windmill's blade has opposite ends that in use face the inside of the blade. Advantageously, these ends are movable to and from each other in order to easily accommodate to the diameter of the blade which is to be mounted or dismounted. Such a yoke is preferably provided with at least first hoisting means near an end that in use faces an inside of a windmill's blade and furthermore it is preferred that at an end opposite to the end where the hoisting means are located, means are provided that are arranged to cooperate with further means of another yoke so as to press both yokes apart.

Advantageously the yoke of the invention is carried out such that it comprises at both its ends pins, which in use are for mounting to a blade of a windmill.

It is further preferable that the yoke is arranged such that the pins are placed at a position so as to be able to cooperation with pin-holes in the blade that are intended for connecting the blade to the windmill's cone.

The invention shall hereinafter be further elucidated with reference to an exemplary embodiment of the lift construction and method for lifting and lowering a windmill's blade in accordance with the invention and with reference to the drawing.

DESCRIPTION OF THE DRAWINGS

FIG. 4-9 shows an operational sequence carried out in a method for dismounting a windmill's blade from a windmill's cone employing the lift construction according to the embodiment of the invention employing the guiding arm shown in FIG. 3.

Wherever in the figures the same reference numerals are applied, these numerals refer to the same parts.

DETAILED DESCRIPTION

Figure 1:
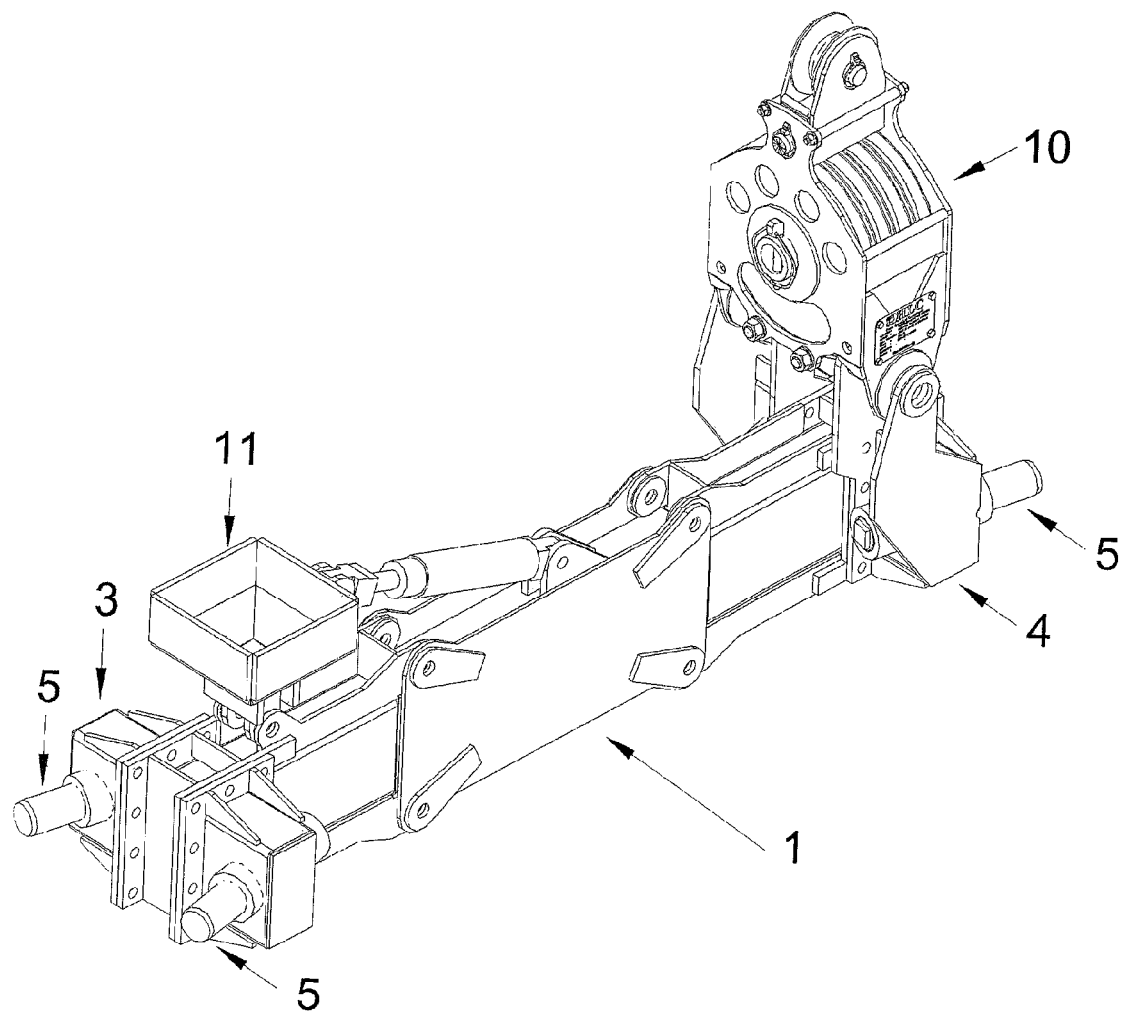
FIG. 1 shows a first yoke forming part of the lift construction of the invention.

Making reference first to FIG. 1, a first yoke 1 is shown which is mountable on the inside of a windmill's blade 2 such as shown in FIGS. 4-9.

As FIG. 1 clearly shows, the first yoke 1 comprises at both its ends 3, 4 pins 5 that in use point at the inside of the blade 2 so as to be able to mount the first yoke 1 to the blade 2. To this end the pins 5 are placed at a position so as to be able to cooperate with pinholes 6 (see FIG. 7) that are circumferentially provided at an end of the windmill's blade 2; see for instance FIG. 7 and FIG. 8 showing one such pinhole. These pinholes 6 are normally used for connecting the blade 2 to the windmill's cone 7.

Figure 2:
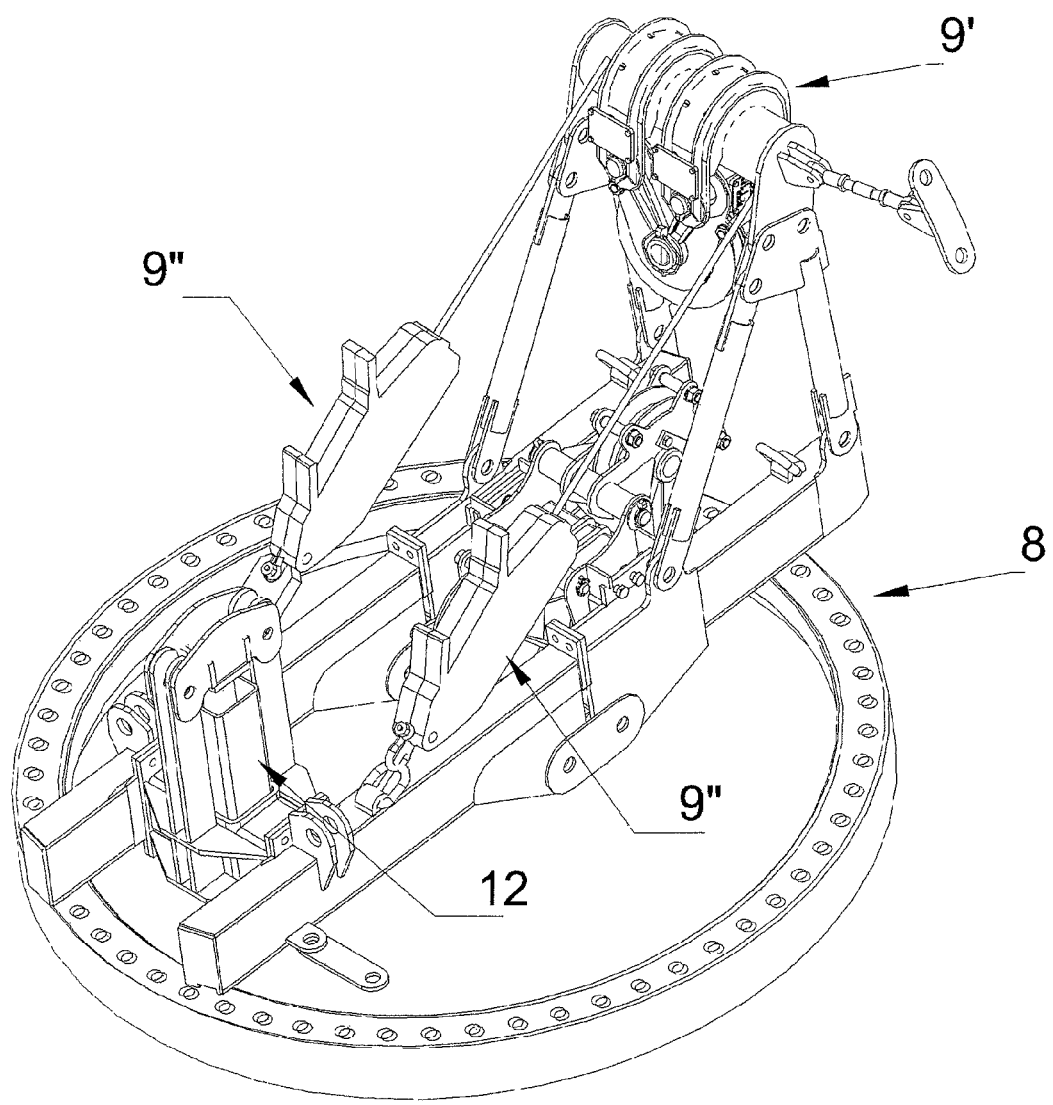
FIG. 2 shows a second yoke forming part of the lift construction in accordance with the invention.

FIG. 2 shows a second yoke 8 of the lift construction of the invention, which is mountable in the cone 7 of the windmill. This second yoke 8 is provided with hoisting means 9', 9\'r I that are connectable to the first yoke 1 shown in FIG. 1 or a part thereof, in particular to a sheave block 10 or pad eye provided on the first yoke 1. The hoisting means 9', 9" preferably include manually adjustable hoisting means 9" as shown in FIG. 2. The said sheave block 10 or pad eye of the first yoke 1 and the hoisting means in the form of winch 9" of the second yoke 8 are provided as FIG. 1 and FIG. 2 respectively show, at the ends of the yokes 1, 8, which—as FIGS. 4-9 clearly show—in use are distant from the windmills standard (not shown). FIG. 1 and FIG. 2 respectively also show that the first yoke 1 and the second yoke 8 comprise positioning means 11, 12 that cooperate with each other and are placed near to the ends of the yokes 1, 8, which in use are closest to the windmill standard (not shown). That means that these positioning or pushing means 11, 12 are furthest away from the front end of the windmill's cone 7 as clearly shown in FIGS. 4-9. By the operation of these positioning means 11, 12 of the first yoke 1 and the second yoke 8 it is possible to maintain a predefined alignment and distance between these ends of the yokes 1, 8 and consequently maintain the blade 2 in a predefined inclination with respect to the windmill's cone 7, also when the bolts are disconnected that are used to secure the blade 2 to the cone 7 of the windmill.

FIG. 1 clearly shows that the first yoke 1 may advantageously be provided with a receptacle 11 and FIG. 2 shows that the second yoke 8 may be provided with an actuator 12—or vice versa—which actuator 12 has an end that accurately fits in the receptacle 11 of the yoke 1 such that upon activation of the actuator 12 a predefined pressure may be applied to the receptacle 11 so as to balance the blade 2 of the windmill in the desired predefined angle and position. In this predefined angle and position the blade 2 of the windmill occupies an alignment with respect to the cone 7 of the windmill that allows it to be easily mounted or dismounted therefrom.

Figure 3:
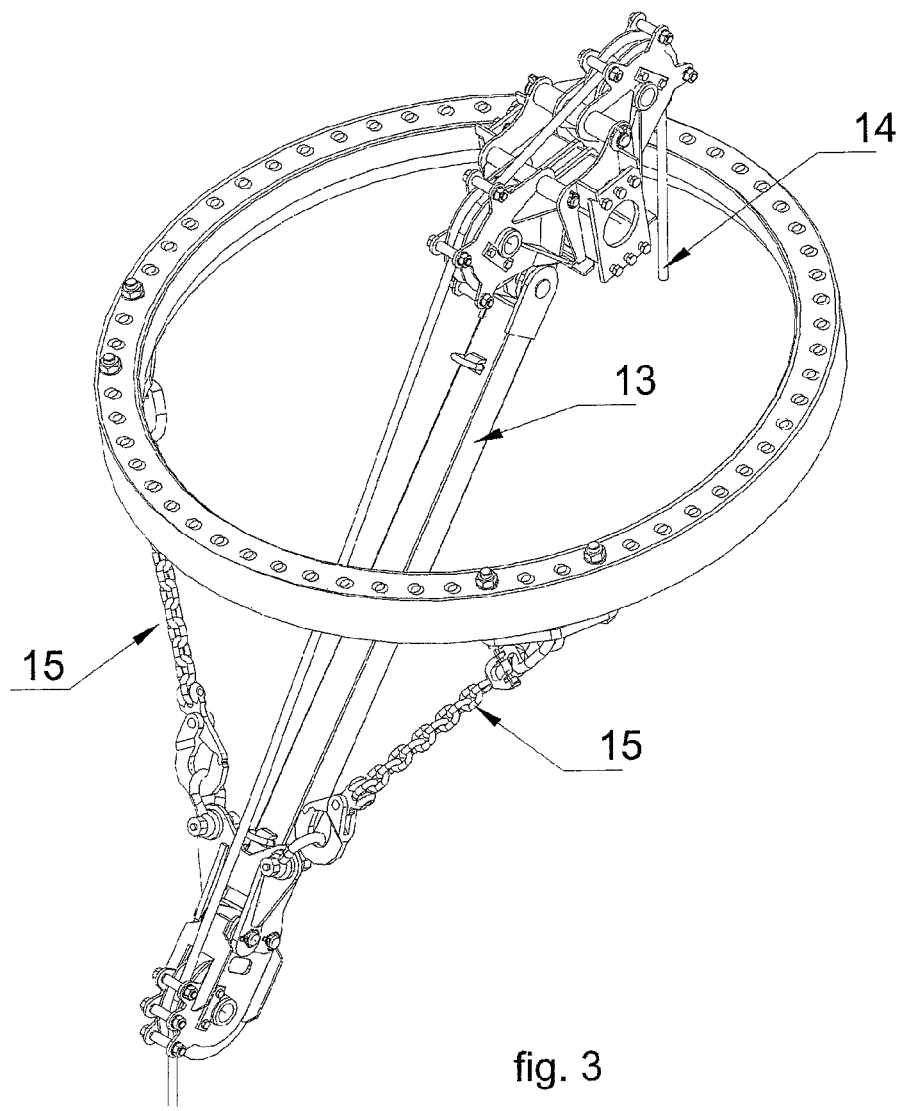
FIG. 3 shows a guiding arm forming part of the lift construction in one embodiment of the invention.

In a certain embodiment the lift construction of the invention also preferably comprises a guiding arm 13 as shown in FIG. 3. With this guiding arm 13 a lifting cable 14 may be guided which is to be connected to the first yoke 1 or a part thereof, in particular to a sheave block 10 or pad eye provided on the first yoke 1. This is shown in FIG. 9. It is preferable that the guiding arm 13 is supported, for instance by connecting chains 15 as is shown in FIG. 3 to connect the arm 13 to the windmill cone 7.

The method and the lift construction of the invention for mounting or dismounting a windmill's blade 2 to a cone 7 of a windmill may now effectively be elucidated with reference to FIGS. 4-9 wherein as an example the dismounting of the blade 2 from the cone 7 is shown schematically.

In FIG. 4, the first yoke 1 has been mounted to the inside of the blade 2. This can easily be done by taking the yoke 1 up by a service hoist of the nacelle or through the inside of the windmill through the (not shown) standard to the cone 7, which cone gives ample room for persons and the lift construction of the invention.

Likewise the second yoke 8 is mounted to the windmill's cone 7 and, in accordance with the invention, the first yoke 1 and the second yoke 8 are provided with positioning means 11, 12 and hoisting means 10, 9'.

Following the mounting of the first yoke 1 and second yoke 8 as shown in FIG. 4, then initially when the blade 2 is still near to the windmill's cone 7—as shown in FIG. 5—the positioning means 11, 12 and hoisting means 10, 9' of the yokes 1, 8 carryout a concerted operation so as to move the windmill's blade 2 away from the cone 7 in a line that substantially coincides with the blade's orientation when in the mounted position as shown in FIG. 4. This line of movement corresponds to the body axis indicated with centre-line 16.

When the blade 2 is beyond a predefined distance with respect to the windmill's cone 7 the concerted operation of the positioning means 11, 12 and hoisting means 10, 9' of the yokes 1, 8 may be interrupted and the hoisting means 10, 9' may then remain the only means of connection between the first yoke 1 connecting to the blade 2 and the second yoke 8 connecting to the cone 7 of the windmill. This is shown in FIG. 6.

In FIG. 7 it is shown that the distance between the blade 2 and the cone 7 of the windmill is further increased by substantially vertically lowering the blade 2 from the cone 7. This gives room for introducing a helpline 17 into the area of the cone 7 which serves to subsequently introduce a guiding arm 13 for a lifting cable 14 into the cone 7. FIG. 8 shows that this guiding arm 13 is connected to the second yoke 8 whereafter subsequently the lifting cable 14 is moved through and down to the hoisting means 10 or pad eye of the yoke 1 that connects to the blade 2. At the stage when this is completed as shown in FIG. 9 it is clearly shown that indeed the lifting cable 14 connects to the hoisting means 10 of the first yoke 1. This allows that by simply operating from the ground the blade 2 may be further lowered so as to receive it eventually at the ground for further handling.

The method for raising a blade 2 and mounting it to the cone 7 of a windmill operates vice versa and requires no further elucidation. The above given exemplary embodiment of the method and lifting construction of the invention is intended solely for illustrative purposes without necessarily restricting the scope of protection of the appended claims to the shown embodiment. The protective scope that merits the invention is entirely determined by the appended claims whereby if necessary any ambiguity of these claims may be explained with reference to the above given elucidation with reference to the exemplary embodiment.

It is claimed:

1. A lift construction for lifting and lowering a blade (2) of a windmill to and from its mounted position at a rotatable cone (7) of the windmill, wherein a yoke is mountable in said cone, characterized in that it comprises two yokes:
    a first yoke (1) of said two yokes mountable to opposing sides at the inside of the blade (9), and
    a second yoke (8) of said two yokes mountable in the cone (7) of the windmill,
    wherein the first yoke (1) and the second yoke (8) are arranged to cooperate, wherein
    the first yoke (1) and the second yoke (8) have cooperating hoisting means (10, 9') that are provided at ends of the yokes which, when in use, are distant from a standard of the windmill, wherein the hoisting means comprise a winch (9', 9") and one of a block (10) or pad eye, and
    wherein one of the first yoke (1) or the second yoke (8) has a receptacle (11) and the other of the first yoke (1) and the second yoke (8) has an actuator (12) near to the ends of the yokes (1,8) which, when in use, are closest to the windmill's standard to cooperatively position the yokes and maintain a predefined alignment and/or distance between the ends of the yokes (1,8).

2. The lift construction according to claim 1, characterized in that the actuator (12) has an end that fits in said receptacle (11), such that upon activation of the actuator (12) a predefined pressure is applied to the receptacle (11) to balance the blade (2) of the windmill at a predefined angle and/or position.

3. The lift construction according to claim 2, characterized in that when at the predefined angle and/or position, the blade (2) of the windmill occupies a position with respect to the cone (7) of the windmill that allows the blade (2) to be mounted or dismounted from the cone (7).

4. The lift construction according to claim 1, characterized in that the first yoke (1) comprises at both ends (3, 4) of the first yoke (1) pins (5), that when in use point at the blade's inside for mounting the first yoke (1) to the blade (2).

5. The lift construction according to claim 4, characterized in that the pins (5) are placed at a position so as to be able to cooperate with pin-holes (6) in the blade (2) that are intended for connecting the blade (2) to the windmill's cone (7).

6. The lift construction according to claim 1, characterized in that the second yoke (8) includes the winch (9', 9") connectable to the block (10) or the pad eye included in the first yoke (1).

7. The lift construction according to claim 6, characterized in that the winch (9") of the second yoke (8) is adjustable.

8. The lift construction according to claim 1, further comprising:
    a guiding arm (13) for a lifting cable (14), wherein the guiding arm (13) is connectable to the second yoke (8).

9. The lift construction according to claim 8, characterized in that the lifting cable (14) is connectable to the first yoke (1) or a part thereof, in particular to hoisting means (10) or a pad eye provided on the first yoke (1).

10. The lift construction according to claim 8, characterized in that the guiding arm (13) is supported, preferably by connecting chains (15) that connect the guiding arm (13) to the windmill's cone (7) or a part thereof.

11. A yoke (1) suitable for mounting at an inside of a blade (2) of a windmill, the yoke having ends (3,4) that when in use face the inside of the blade (2), and the ends (3,4) are movable to and from each other, characterized in that the yoke includes at least one block (10) or pad eye near an end (4) of the blade (2) that when in use faces the inside of the windmill's blade (2), the yoke further including at the end (3) opposite to the end (4) where the block (10) or the pad eye is located, a receptacle (11) to cooperate with an actuator (12) of a second yoke (8) to position the yokes (1,8) in relation to one another.

12. The yoke (1) according to claim 11, wherein the receptacle (11) is arranged to cooperate with actuator (12) of a second yoke (8) to press both yokes (1, 8) apart from one another.

13. The yoke (1) according to claim 11, characterized in that the yoke comprises at both ends (3, 4) pins (5), that when in use are for mounting the yoke to a blade (2) of a windmill.

14. The yoke (1) according to claim 13, characterized in that the pins (5) are placed at a position on as to be able to cooperate with pin-holes (6) in the blade (2) that are intended for connecting the blade (2) to a windmill's cone (7).

15. A method for mounting or dismounting a windmill's blade (2) to a cone (7) of a windmill, characterized in that two yokes (1, 8) are employed, the method comprising:
    mounting a first yoke (1) to the blade's inside,
    mounting a second yoke (8) in the windmill's cone (7),
    wherein the first yoke (1) includes a receptacle (11) and a block (10) or a pad eye, and the second yoke (8) includes an actuator (12) and a winch (9'),
    wherein the method is executed such that when the blade (2) is near to the windmill's cone (7), the receptacle (11) and a block (10) or a pad eye of the first yoke (1) interact cooperatively with the actuator (12) and a winch (9') of the second yoke (8) to move the windmill's blade (2) towards or away from the cone (7) in a line that substantially coincides with the blade's orientation when in the mounted position, and that when the blade (2) is beyond a predefined distance with respect to the windmill's cone (7), the blade (2) is lifted or lowered substantially vertically.

* * * * *